US012438282B2

(12) United States Patent
Hollaender et al.

(10) Patent No.: US 12,438,282 B2
(45) Date of Patent: Oct. 7, 2025

(54) ANTENNA DEVICE, RADAR SENSOR DEVICE AND METHOD FOR PRODUCING AN ANTENNA DEVICE

(71) Applicant: Robert Bosch GmbH, Stuttgart (DE)

(72) Inventors: Christian Hollaender, Waldbronn (DE); Juergen Hildebrandt, Weilheim (DE); Klaus Baur, Mietingen (DE); Michael Schoor, Stuttgart (DE); Minh Nhat Pham, Leinfelden-Echterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 295 days.

(21) Appl. No.: 18/064,539

(22) Filed: Dec. 12, 2022

(65) Prior Publication Data

US 2023/0291115 A1 Sep. 14, 2023

(30) Foreign Application Priority Data

Feb. 10, 2022 (DE) ..................... 10 2022 201 374.3

(51) Int. Cl.

*H01Q 13/10* (2006.01)
*H01Q 9/04* (2006.01)
*H01Q 21/28* (2006.01)

(52) U.S. Cl.

CPC ......... *H01Q 13/106* (2013.01); *H01Q 9/0407* (2013.01); *H01Q 21/28* (2013.01)

(58) Field of Classification Search

CPC ....... H01Q 9/0485; H01Q 1/02; H01Q 1/2283
See application file for complete search history.

(56) References Cited

U.S. PATENT DOCUMENTS

2005/0285773 A1* 12/2005 Hartzstein ............ H01Q 1/3233 342/107
2015/0380824 A1* 12/2015 Tayfeh Aligodarz ........................ H01Q 15/0066 430/319
2019/0165462 A1* 5/2019 Shiozaki ................ H01Q 15/14
2019/0165484 A1* 5/2019 Shiozaki ................ H01Q 15/08
2022/0256685 A1* 8/2022 Brandenburg ......... H01Q 13/22

FOREIGN PATENT DOCUMENTS

WO 2021032423 A1 2/2021

* cited by examiner

*Primary Examiner* — Dameon E Levi
*Assistant Examiner* — Aladdin Abdulbaki
(74) *Attorney, Agent, or Firm* — NORTON ROSE FULBRIGHT US LLP

(57) ABSTRACT

An antenna device. The antenna device includes a carrier element having at least one first strip conductor and having a second strip conductor; at least one fastening structure, which is formed in or on the carrier element; at least one antenna element, which is arranged or fastened on or in the fastening structure and is connected to the strip conductor; a transmitter device, which is arranged on the carrier element and is connected to the second strip conductor, and is designed to transmit a transmitter signal to the at least one antenna element and/or to receive a transmitter signal from the at least one antenna element.

18 Claims, 5 Drawing Sheets

ANTENNA DEVICE, RADAR SENSOR DEVICE AND METHOD FOR PRODUCING AN ANTENNA DEVICE

CROSS REFERENCE

The present application claims the benefit under 35 U.S.C. § 119 of German Patent Application No. DE 10 2022 201 374.3 filed on Feb. 10, 2022, which is expressly incorporated herein by reference in its entirety.

FIELD

The present invention relates to an antenna device, a radar sensor device and a method for producing an antenna device.

BACKGROUND INFORMATION

Radar sensors for vehicles may be used to realize comfort functions, for example adaptive cruise control, and safety functions, for example emergency braking systems. Such sensors are essentially notable for the advantage of measuring physical variables directly rather than interpreting images, for example from a video camera.

Radar sensors may usually transmit high-frequency radar beams and receive the components reflected from surrounding objects via an antenna structure. In this context, the detected objects may be stationary or moving. A distance and the direction (angle) relative to the measured object may be advantageously calculated using the received radar beams. It is furthermore possible to calculate the relative radial velocity of an object with respect to the radar sensor, typical radar sensors being capable of operating in a frequency range between 76 and 77 GHz, for example, and in some regions even at 77-81 GHz.

Planar antennas may conventionally be installed on a printed circuit board, whereby this antenna design may be manufactured using printed circuit board technology without additional components. Future radar sensors will be expected to cover an extended frequency range of 76-81 GHz, in which planar antenna may only operate inadequately or with significant degradation in the emission properties. Special radar IC housings, in which the antennas are already integrated in the package (Antenna in Package), could be suitable alternatives to planar antennas on printed circuit boards, it being possible to solder these on as standard SMD components which, due to the direct emission from the package, do not require a special additional high-frequency printed circuit board material, but may instead be soldered onto any standard electronic printed circuit board.

PCT International Patent Application No. WO 2021/032423 A1 describes a radar sensor for a motor vehicle.

SUMMARY

The present invention provided an antenna device, a radar sensor device, and a method for producing an antenna device.

Preferred developments of the present invention are disclosed herein.

An idea on which the present invention is based includes specifying an antenna device, a radar sensor device and a method for producing an antenna device, whereby the radiation emission and reception characteristics may be improved.

An object of the present invention is to provide a solution for an Antenna in Package technology, which, despite compact dimensions of the housing, enables broadband and efficient emission with a high antenna gain. The mounting of the elements as derived from the present invention increases the gain.

According to an example embodiment of the present invention, the antenna device comprises a carrier element having a strip conductor; at least one fastening structure, which is formed in or on the carrier element; at least one antenna element, which is arranged or fastened on or in the fastening structure and is connected to the strip conductor; a transmitter device, which is arranged on the carrier element and is connected to the strip conductor, and is designed to transmit a transmitter signal to the at least one antenna element and/or to receive a transmitter signal from the at least one antenna element.

The fastening structure may be a socket and/or a solder or adhesive, it being possible for the fastening structure to conductively connect the antenna element to the first and/or second strip conductor. The carrier element may comprise a printed circuit board, having a conductive coating which may represent the first and/or second strip conductor. The antenna device may therefore serve as a transmitter device in a vehicle or in other areas.

The bottom signal layer (strip conductor and/or underside of the carrier) serves for routing the IC (transmitter device) for both low frequency and high frequency signals. As with a printed circuit board, a plurality of layers may be used for this purpose. As is the case in conventional electrical engineering, for example, a via may be used to couple the RF high frequency signals into a top layer (strip conductor), which via is routed to an emission/coupling-in structure located on the top layer (upper side of the carrier). However, there are also various options for coupling without galvanic contact via a field coupling.

The further electrically conductive layer is furthermore not compulsory; the emission/coupling-in structure could also lie directly on the bottommost layer.

According to a preferred specific embodiment of the antenna device of the present invention, this is formed as a chip, wherein the at least one antenna element is formed to emit and receive radar radiation.

The chip form may be realized by a microchip configuration.

According to a preferred specific embodiment of the antenna device of the present invention, the at least one antenna element comprises a dielectric resonator antenna.

According to a preferred specific embodiment of the antenna device of the present invention, the dielectric resonator antenna has a cylindrical form or cuboidal form.

As a result of the cylindrical form or cuboidal form, or even as a result of other, alternative forms, it is possible to achieve predetermined emission characteristics and to make use of certain spatial conditions in a transmitter device. In this case, double or multiple arrangements of the antenna elements may be provided, so-called arrays of antenna elements, which may be arranged closely or directly adjacent to one another or apart from one another.

According to a preferred specific embodiment of the antenna device of the present invention, the transmitter device comprises an IC chip and is arranged on an underside or upper side of the carrier element and the at least one antenna element is arranged on an upper side or on the underside of the carrier element, the strip conductor comprising a first strip conductor and a second strip conductor, the antenna element being connected to the first strip conductor and the transmitter device being connected to the second strip conductor.

According to a preferred specific embodiment of the antenna device of the present invention, the fastening structure comprises a slot or a microstrip line or a patch coupling.

A patch is an emission element which is designed to be resonant.

In this case, the geometries—rectangular in the simplest form—are matched to the corresponding wavelength.

According to a preferred specific embodiment of the antenna device of the present invention, the antenna element comprises a pair of individual antennas.

According to an example embodiment of the present invention, the radar sensor device comprises a printed circuit board; an antenna device according to the present invention, which is arranged on the printed circuit board; a radome, which covers the printed circuit board and allows radar radiation to pass through; a heat conductor, which is thermally connected to the printed circuit board and/or to the antenna device.

The radome may be a cover which may cover the housing of the radar sensor device and may be permeable to a certain radar radiation and may orient this in a certain direction.

A combination of Antenna in Package technology and dielectric resonator antennas may be advantageously achieved. Consequently, despite the compact package dimensions, a cost-effective, broadband and efficient emission with a high antenna gain may be enabled. It is advantageously possible to dispense with a complex high frequency printed circuit board with special technologies or specific high frequency substrate materials, since the high frequency signal no longer has to be routed or emitted via the printed circuit board. Consequently, favorable printed circuit boards using standard FR4 technology may be used. Furthermore, a flexible modularity may be advantageously achieved. The emission characteristics may be adapted without complex modifications to the package by fitting antenna elements of a different design. Customarily, the high frequency signal may be routed, via solder points (solder balls) or bonding wires, from the IC or package to etched structures on printed circuit boards, which may require special expensive high frequency substrates. In the present case, the emission is realized directly from the package via the Antenna in Package technology with additional dielectric elements.

According to a preferred specific embodiment of the radar sensor device of the present invention, the antenna device is arranged on an upper side of the printed circuit board and the at least one antenna element extends away from the printed circuit board in the direction of the radome, advantageously into a clearance between the radome and the carrier element or printed circuit board.

Radar sensor components may be integrated into an overall vehicle system for realizing comfort and safety functions, it being possible to combine the radar sensors with other sensors in an overall system, for instance with a night vision camera, a normal camera (stereo), ultrasonic sensors.

Long-range radar sensors may be present, with a detection distance of approximately 250 m and a horizontal field of view of 12° at 250 m; 30° at 30 m. A night vision camera may be present, with a detection distance of approximately 150 m and a horizontal field of view of 32°. A medium-range radar sensor (forwards from the vehicle) may be present, with a detection distance of approximately 160 m and a horizontal field of view of 12° at 160 m and 90° at 25 m. A multi-purpose camera or multi-camera system or a stereo camera may be present, with a detection distance of approximately 120 m (for objects) and a horizontal field of view of 50° (nominal). A rear camera may be present, with a detection distance of approximately 15 m and a horizontal field of view of 130° or 180°.

Any desired combination and range coverages may be provided, for example 5 radar sensors (1 medium-range radar+4 corner radars)+1 video sensor. Any desired combination of radar, video, ultrasound and Lidar may be possible and implementable. For example, 1×front radar, 4×corner radars, ×side radars, ×rear radars+further sensors, for instance also for interior monitoring or other applications.

A medium range radar of approximately 80 m and a horizontal field of view of 150° may be present. A multi-camera system, with a detection distance of approximately 15 m and a horizontal field of view of 360°, may be present. An ultrasonic sensor (individual or multiple sensors), with detection of approximately 5 m and a horizontal field of view of 60°, may be present.

According to a preferred specific embodiment of the radar sensor device of the present invention, the antenna device is arranged on an underside of the printed circuit board and the at least one antenna element extends through an opening in the printed circuit board in the direction of the radome.

Dielectric resonator Antennas (DRAB) may be formed with three-dimensional geometries from a dielectric material. In this case, the form and dielectric constant of the material determine the resonant frequency and emission characteristics of the antenna element. DRA antennas advantageously offer advantageous characteristics at high frequencies in the microwave range, since the efficiency does not suffer from significantly increased metallic line losses as the frequency increases. In addition, these may have a comparatively simple broadband design, be cost-effectively produced and used for lateral minimization. Therefore, with a combination of DRAB and Antenna in Package technologies, a broadband and efficient emission with a high antenna gain may be enabled, along with compact dimensions.

As a result of the design and/or material used, the DRA elements further enable additional design freedom for the formation of radiation patterns, for example for use in in antennas with a wide radar field of view. It is possible to achieve a very wide field of view coverage over a very large angular range. In this context, the radiation pattern may, in the simplest case, be adapted according to the desired requirements without modifications to the package, simply by fitting DRA elements of a different design.

Furthermore, the technology according to the present invention may also be used in other high frequency products, for example in the 5G range.

According to an example embodiment of the present invention, the method for producing an antenna device involves: providing a carrier element having a strip conductor; forming at least one fastening structure, which is formed in or on the carrier element; arranging at least one antenna element, which is arranged or fastened on or in the fastening structure and is connected to the strip conductor; arranging a transmitter device, which is arranged on the carrier element and is connected to the strip conductor, and is designed to transmit a transmitter signal to the at least one antenna element and/or to receive a transmitter signal from the at least one antenna element.

The radar sensor device and/or the antenna device of the present invention may also be notable for the features mentioned in connection with the method—and the advantages thereof—and vice versa.

Further features and advantages of specific embodiments of the present invention are derived from the following description with reference to the accompanying drawings.

BRIEF DESCRIPTION OF THE DRAWINGS

The present invention is explained in more detail below with reference to the exemplary embodiments specified in the schematic figures.

In the figures, similar or functionally similar elements are denoted by the same reference signs.

DETAILED DESCRIPTION OF EXAMPLE EMBODIMENTS

Figure 1:
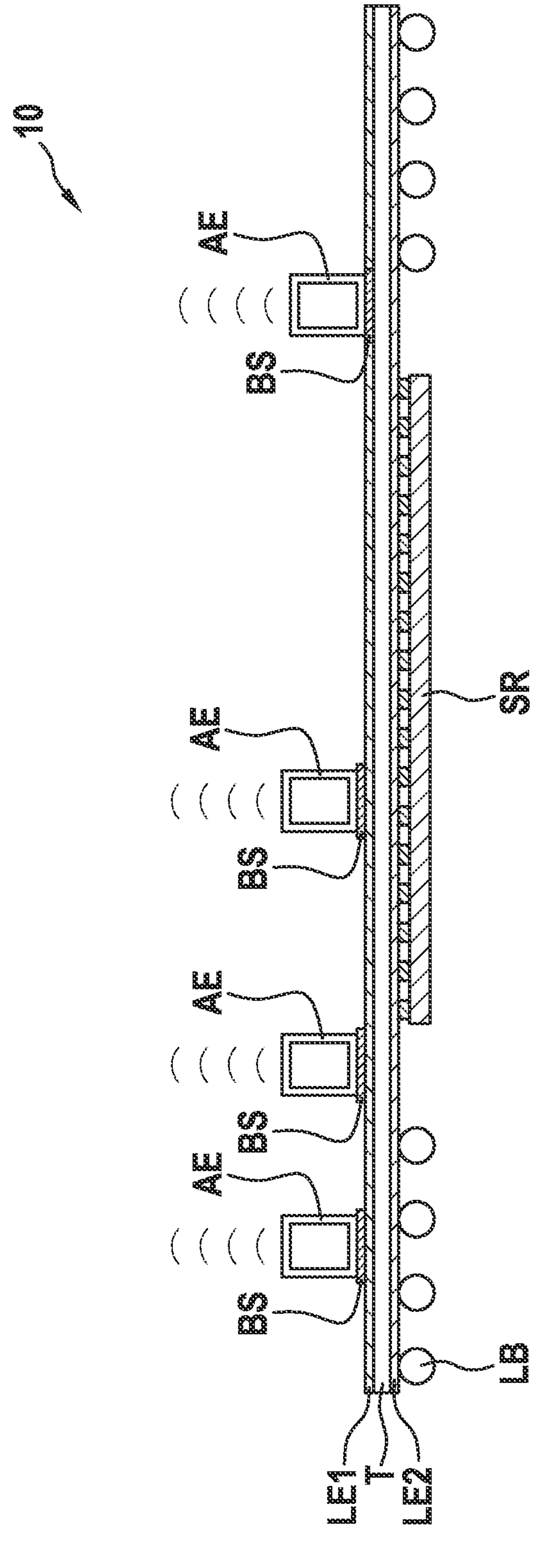
FIG. 1 shows a schematic side view of an antenna device according to an exemplary embodiment of the present invention.

FIG. 1 shows a schematic side view of an antenna device according to an exemplary embodiment of the present invention.

The antenna device 10 comprises a carrier element T having at least one first strip conductor LE1, for instance as a coating on an upper side of the carrier element T, and having a second strip conductor LE2, for instance as a coating on an underside of the carrier element T; advantageously, a plurality of fastening structures BS, which are formed in or on the carrier element T; a plurality of antenna elements AE, which may be arranged or fastened on or in a respective fastening structure BS and may be connected to the first strip conductor LE1; a transmitter device SR, which is arranged on the carrier element T and is connected to the second strip conductor LE2, and is designed to transmit a transmitter signal to the at least one antenna element AE and/or to receive a transmitter signal from the at least one antenna element AE.

The antenna device AE may be formed as a chip (package), wherein the at least one antenna element AE is formed to emit and receive radar radiation. The antenna element AE may comprise a dielectric resonator antenna and the dielectric resonator antenna may have a cylindrical form or a cuboidal form. The transmitter device SR may comprise an IC chip and be arranged on an underside of the carrier element T and the at least one antenna element AE may be arranged on an upper side or on the underside of the carrier element T.

The antenna device 10 may be formed as a radar package and the transmitter device SR may comprise an RF IC (MMIC or SoC) in a housing with a conductive coating on the carrier element (routing layer). Package variants are possible here, for example eWLB (embedded Wafer Level Ball grid array), BGA (Ball Grid Array), LGA (Land Grid Array), FCCSP (Flip-Chip Chip Scale Package) as currently used package variants.

A wide variety of packages with an interposer and, if necessary, a molding compound in eWLB, BGA or LGA form, for example, may be used as the package. A transmitter device SR using Flip Clip technology mounted on a carrier element as an interposer is shown by way of example as an IC. The routing of the high frequency signals takes place in the package using a proven type of line routing via the routing layer. Examples of this are stripline, microstrip line, grounded coplanar waveguides or substrate integrated waveguides, which may be encompassed by the first and/or second strip conductor (strip conductor in the sense of a power line and/or wave line). High frequency through-connections through various layers may be realized by a galvanic connection using vias or a field coupling. The carrier element T may be mounted in a radar sensor device (FIG. 4 or FIG. 5) with solder points LB on the underside of the package.

A signal transfer between the two strip conductors may be realized using a through-contact or via.

Figure 2:
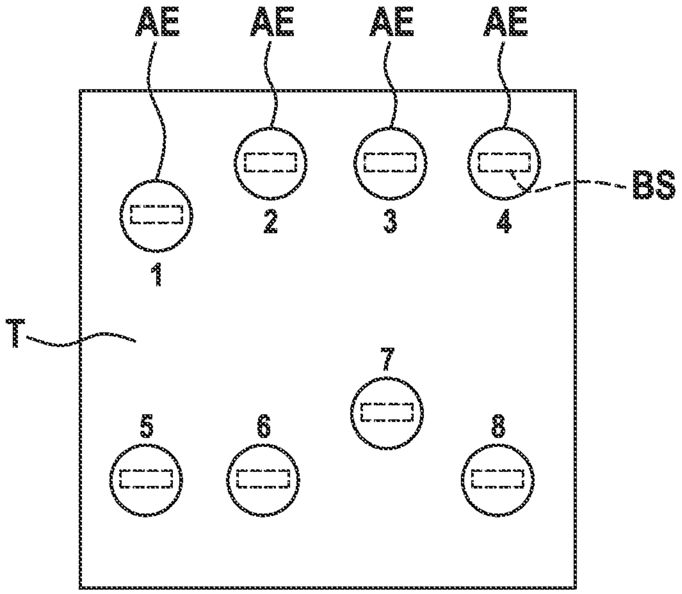
FIG. 2 shows a schematic plan view of a carrier in an antenna device according to an exemplary embodiment of the present invention.

FIG. 2 shows a schematic plan view of a carrier in an antenna device according to an exemplary embodiment of the present invention.

In a plan view looking onto the surface of the carrier element from the direction of the antenna elements, it is possible to see the fastening structures BS in which the antenna elements AE are arranged. It should be noted here that "fastening structures" is a generic term, since these may represent both a material for fastening the antenna elements and a structure, for example a slot or socket region, for inserting the antenna elements, specifically the region in which the antenna elements may be placed and fastened. Since the signal may be transported via the carrier (as a routing, for instance via the strip conductors) and may be conducted from an underside through to the upper side of the carrier (and vice versa), the fastening structures in this case may also serve as coupling structures for coupling the antenna elements to the carrier and forwarding the signal to the transmitter device.

By way of example, FIG. 2 shows 8 such regions comprising fastening structures BS, which may be formed as circular sockets with holders (slots or other holders) with or without an adhesive connection or soldered connection. The fastening structure BS may comprise a slot or a microstrip or a patch coupling. Furthermore, the antenna element AE may comprise a pair of individual antennas. The holder or fastening structure may also constitute an opening through the carrier element and be connected to a routing (strip conductor for power and/or waves) on the upper side and on the underside of the carrier element, via which a transmitter signal may be conducted from the upper side to the underside (and, from there, to the antenna element and/or the transmitter device) and vice versa.

In its simplest form, each such fastening structure BS represents an antenna channel and comprises a DRA element. The 8 channels may each possess a DRA antenna. The coupling of the DRAs is realized via fastening elements on or in the package or molding compound (soldered connection or potting compound). This may be a slot, microstrip coupling or patch coupling, for example. The DRAs may be fastened on the package using an adhesive connection, for example. The DRAs may have a cylindrical or cuboidal design or they may have any other desired geometric form.

Figure 3:
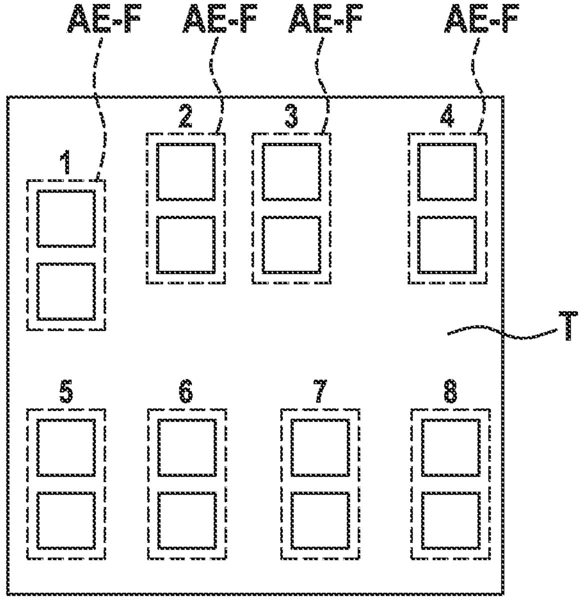
FIG. 3 shows a schematic plan view of a carrier in an antenna device according to a further exemplary embodiment of the present invention.

FIG. 3 shows a schematic plan view of a carrier in an antenna device according to a further exemplary embodiment of the present invention.

FIG. 3 shows fields of double antenna elements AE-F, which may be arranged in or on the fastening elements BS. This shows a plan view of the carrier element T in the sense of FIG. 2. This relates to a package variant with exemplary array arrangements with double antenna elements for further forming the radiation pattern and focusing or defocusing it in desired regions or optimizing antenna parameters such as side lobes. The arrangement and number of elements may be varied in this case in order to configure the emission profile according to the desired requirements.

Figure 4:
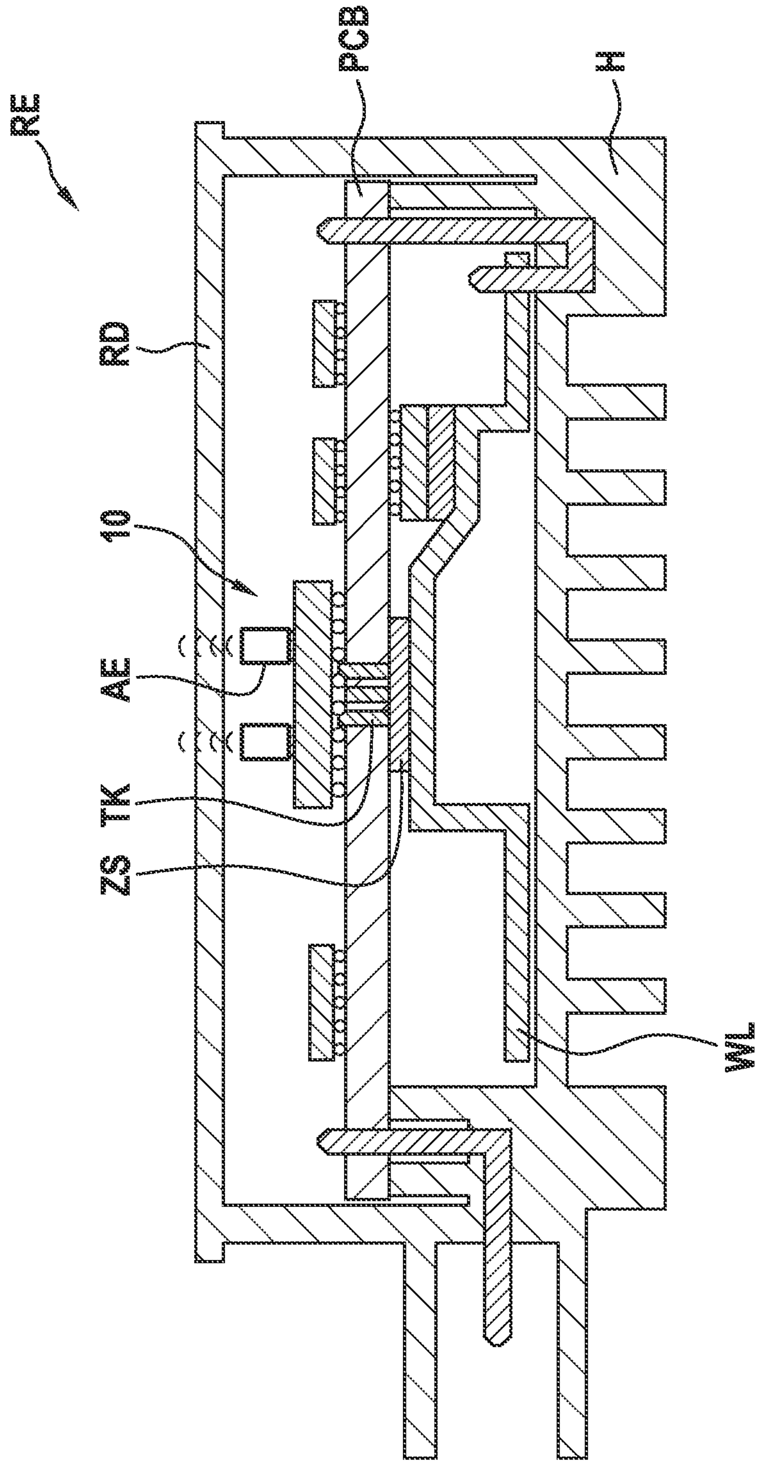
FIG. 4 shows a schematic side view of a radar sensor device according to an exemplary embodiment of the present invention.

FIG. 4 shows a schematic side view of a radar sensor device according to an exemplary embodiment of the present invention.

The radar sensor device RE comprises a printed circuit board PCB in a housing H; an antenna device 10 according to the present invention, which is arranged on the printed circuit board PCB; a radome RD, which covers the printed circuit board and allows radar radiation to pass through; a heat conductor WL, which is thermally connected to the printed circuit board and/or to the antenna device 10. The antenna device 10 may be arranged on an upper side of the printed circuit board PCB and the at least one antenna element AE extends away from the printed circuit board PCB in the direction of the radome. The antenna device 10 may be arranged on the printed circuit board PCB as a package, i.e. as a package arrangement, and thus integrated in the sensor. In this case, the package may be mounted on the upper side of the printed circuit board.

The thermal intermediate layer ZS (thermal connecting element) may be arranged on the heat conductor WL and both may be arranged within the housing H and covered by the radome RD. Thermal through-contacts TK may extend from the intermediate layer ZS through the printed circuit board PCB to the antenna device 10 and be thermally connected to this latter on the upper side of the printed circuit board PCB. The printed circuit board PCB may be arranged on the intermediate layer ZS, or be in contact therewith, at least in some regions.

Figure 5:
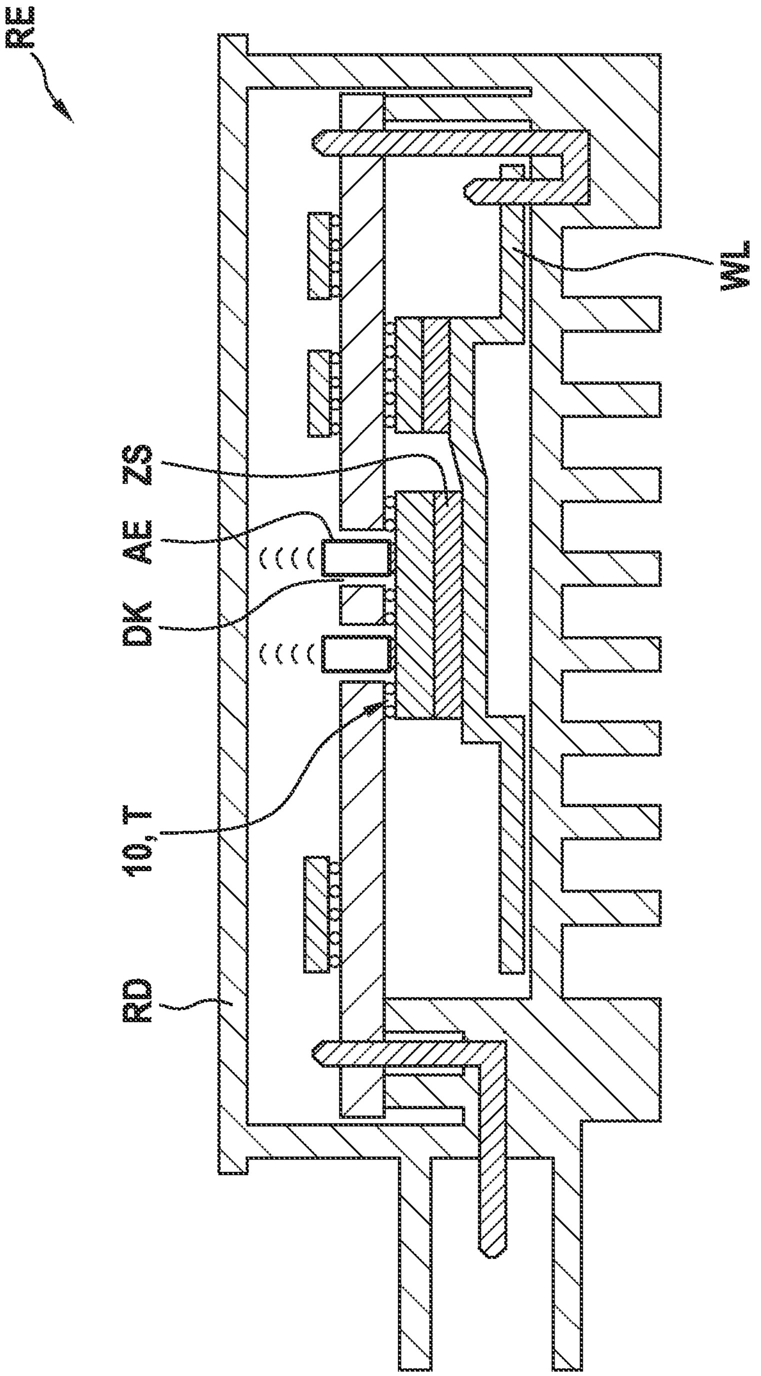
FIG. 5 shows a schematic side view of a radar sensor device according to a further exemplary embodiment of the present invention.

FIG. 5 shows a schematic side view of a radar sensor device according to a further exemplary embodiment of the present invention.

In the radar sensor device RE according to FIG. 5, the antenna device 10 may be arranged on an underside of the printed circuit board PCB and the at least one antenna element AE may extend through an opening DK in the printed circuit board PCB in the direction of the radome and then in the direction of the radome RD. The carrier or the transmitter device of the antenna device 10 may be arranged directly on a thermal intermediate layer ZS (thermal connecting element). Consequently, the transmitter device of the antenna device 10, designed, for instance, as an RF IC, may be mounted on the rear side of the printed circuit board PCB. In this case, the antenna elements AE may project upwards through the respective openings DK in the printed circuit board PCB towards the radome RD. If the transmitter device is placed on the rear side (on the underside and facing away from the radome), improved thermal cooling may be advantageously achieved by directly connecting the package to a heat conductor WL or to the housing rear wall on the rear side. Advantages are furthermore realized due to a lower interference emission of the radar package due to a shielding effect of the printed circuit board PCB to the lateral side and to the underside. In addition, the openings DK in the printed circuit board may be used to further optimize the antenna characteristics. Relevant factors here are the size of the openings DK and the type of material used for the surface of the openings, it being possible for the surfaces of the openings (the walls of the openings) to be metalized for this purpose. The thermal intermediate layer ZS (thermal connecting element) may be arranged on the heat conductor WL and both may be arranged within the housing H and covered by the radome RD.

Figure 6:
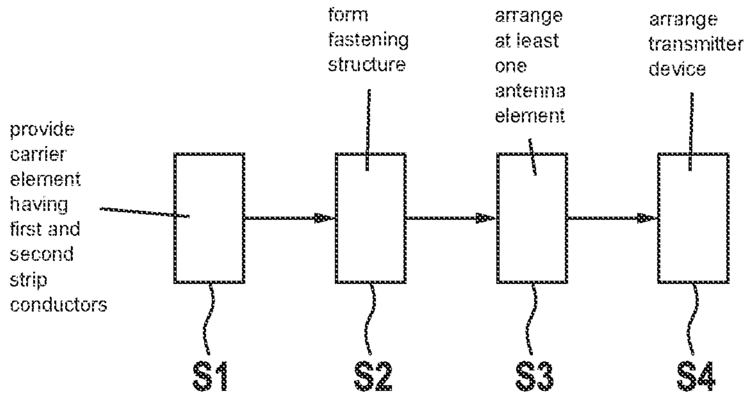
FIG. 6 shows a block diagram of method steps of the method for producing an antenna device according to an exemplary embodiment of the present invention.

FIG. 6 shows a block diagram of method steps of the method for producing an antenna device according to an exemplary embodiment of the present invention.

The method for producing an antenna device involves: providing S1 a carrier element having at least one first strip conductor and having a second strip conductor; forming S2 at least one fastening structure, which is formed in or on the carrier element; arranging S3 at least one antenna element, which is arranged or fastened on or in the fastening structure and is connected to the first strip conductor; arranging S4 a transmitter device, which is arranged on the carrier element and is connected to the second strip conductor, and is designed to transmit a transmitter signal to the at least one antenna element and/or to receive a transmitter signal from the at least one antenna element.

Although the present invention was described in its entirety above with reference the preferred exemplary embodiment, it is not limited thereto, but may be modified in a variety of ways.

What is claimed is:

1. An antenna device, comprising:
- a carrier element having a strip conductor;
- at least one fastening structure, which is formed in or on the carrier element, wherein the fastening structure includes a slot or a microstrip line or a patch coupling;
- at least one antenna element, which is arranged or fastened on or in the fastening structure and is connected to the strip conductor; and
- a transmitter device, which is arranged on the carrier element and is connected to the strip conductor, and is configured to transmit a transmitter signal to the at least one antenna element and/or to receive a transmitter signal from the at least one antenna element.

2. The antenna device as recited in claim 1, which is formed as a chip and wherein the at least one antenna element is configured to emit and receive radar radiation.

3. The antenna device as recited in claim 1, wherein the at least one antenna element includes a dielectric resonator antenna.

4. The antenna device as recited in claim 3, wherein the dielectric resonator antenna has a cylindrical form or cuboidal form.

5. The antenna device as recited in claim 1, wherein the transmitter device includes an IC chip and is arranged on an underside or upper side of the carrier element, and the at least one antenna element is arranged on an upper side or on the underside of the carrier element, the strip conductor including a first strip conductor and a second strip conductor, the antenna element being connected to the first strip conductor and the transmitter device being connected to the second strip conductor.

6. A radar sensor device comprising:
- an antenna device, wherein the antenna device includes:
  - a carrier element having a strip conductor;
  - at least one fastening structure, which is formed in or on the carrier element;
  - at least one antenna element, which is arranged or fastened on or in the fastening structure and is connected to the strip conductor; and
  - a transmitter device, which is arranged on the carrier element and is connected to the strip conductor, and is configured to transmit a transmitter signal to the at least one antenna element and/or to receive a transmitter signal from the at least one antenna element;

a printed circuit board on which the antenna device is arranged;

a radome, which covers the printed circuit board and allows radar radiation to pass through; and a heat conductor, which is thermally connected to the printed circuit board and/or to the antenna device, wherein the antenna device is arranged on an underside of the printed circuit board and the at least one antenna element extends through an opening in the printed circuit board in a direction of the radome.

7. A method for producing a radar sensor device, the method comprising the following steps:

forming an antenna device, the forming of the antenna device comprising:

providing a carrier element having a strip conductor;

forming at least one fastening structure, which is formed in or on the carrier element, wherein the fastening structure includes a slot or a microstrip line or a patch coupling;

arranging at least one antenna element, which is arranged or fastened on or in the fastening structure and is connected to the strip conductor; and arranging a transmitter device, which is arranged on the carrier element, is connected to the strip conductor, and is configured to transmit a transmitter signal to the at least one antenna element and/or to receive a transmitter signal from the at least one antenna element; and integrating the antenna device into an arrangement by which radar radiation can reach the antenna device from an environment surrounding the radar sensor device and/or be emitted by the antenna device into the environment.

8. The method as recited in claim 7, wherein the integrating includes:

arranging the antenna device on a circuit board; and covering the antenna device that is on the circuit board with a radome that allows radar radiation to pass through.

9. The method as recited in claim 8, further comprising thermally connecting a heat conductor to the printed circuit board and/or to the antenna device.

10. A radar sensor device comprising:

an antenna device, wherein the antenna device includes:

a carrier element having a strip conductor;

at least one fastening structure, which is formed in or on the carrier element;

at least one antenna element, which is arranged or fastened on or in the fastening structure and is connected to the strip conductor; and a transmitter device, which is arranged on the carrier element and is connected to the strip conductor, and is configured to transmit a transmitter signal to the at least one antenna element and/or to receive a transmitter signal from the at least one antenna element;

a printed circuit board on which the antenna device is arranged;

a radome, which covers the printed circuit board and allows radar radiation to pass through; and a heat conductor, which is thermally connected to the printed circuit board and/or to the antenna device, wherein the fastening structure includes a slot or a microstrip line or a patch coupling.

11. The radar sensor device as recited in claim 10, wherein the antenna device is arranged on an upper side of the printed circuit board and the at least one antenna element extends away from the printed circuit board in a direction of the radome.

12. The radar sensor device as recited in claim 10, wherein the antenna device is formed as a chip.

13. The radar sensor device as recited in claim 10, wherein the antenna device is configured to emit and receive the radar radiation.

14. The radar sensor device as recited in claim 10, wherein the at least one antenna element includes a dielectric resonator antenna.

15. The radar sensor device as recited in claim 14, wherein the dielectric resonator antenna has a cylindrical form.

16. The radar sensor device as recited in claim 14, wherein the dielectric resonator antenna has a cuboidal form.

17. The radar sensor device as recited in claim 10, wherein:

the transmitter device includes an IC chip and is arranged on an underside or upper side of the carrier element;

the at least one antenna element is arranged on the upper side or on the underside of the carrier element;

the strip conductor includes a first strip conductor and a second strip conductor;

the at least one antenna element is connected to the first strip conductor; and the transmitter device is connected to the second strip conductor.

18. The radar sensor device as recited in claim 10, wherein the antenna element include a pair of individual antennas.

* * * * *